US005589867A

United States Patent [19]

Yamaguchi

[11] Patent Number: 5,589,867

[45] Date of Patent: Dec. 31, 1996

[54] METHOD AND APPARATUS FOR FORMING AN IMAGE ON A RECORDING MEDIUM

[75] Inventor: Chiseki Yamaguchi, Tokyo, Japan

[73] Assignee: NEC Corporation, Tokyo, Japan

[21] Appl. No.: 264,525

[22] Filed: Jun. 23, 1994

[30] Foreign Application Priority Data

Jun. 23, 1993 [JP] Japan .................................... 5-150958

[51] Int. Cl.[6] .................................................... G01D 15/06

[52] U.S. Cl. .......................... 347/141; 347/151; 347/158

[58] Field of Search .................................... 347/141, 142, 347/151, 158, 149; 355/245

[56] References Cited

U.S. PATENT DOCUMENTS

| | | | |
|---|---|---|---|
| 4,439,781 | 3/1984 | Yano . | |
| 4,502,061 | 2/1985 | Ando . | |
| 4,544,935 | 10/1985 | Sakai . | |
| 4,553,149 | 11/1985 | Yano . | |
| 4,763,143 | 8/1988 | Ohba et al. . | |
| 4,977,415 | 12/1990 | Oba et al. . | |
| 5,153,611 | 10/1992 | Kokado et al. | 355/261 X |
| 5,153,616 | 10/1992 | Asanae et al. . | |
| 5,198,839 | 3/1993 | Takahashi et al. . | |

FOREIGN PATENT DOCUMENTS

| | | | |
|---|---|---|---|
| 0522813 | 7/1991 | European Pat. Off. | G03G 5/08 |

OTHER PUBLICATIONS

*Patent Abstracts of Japan*, vol. 14, No. 484, Oct. 22, 1990, p. 89, corresponding to JP-A-02 196 257.

*Patent Abstracts of Japan*, vol. 17, No. 267, May 25, 1993, p. 89, corresponding to JP-A-05 006 083.

*Primary Examiner*—Robert Beatty
*Attorney, Agent, or Firm*— Sughrue, Mion, Zinn, Macpeak & Seas

[57] ABSTRACT

An image forming method includes the steps of supplying a toner onto a surface of a toner carrier to form a toner pattern injected with static charge by controlling the toner mass and amount of the static charge using a toner supply control member disposed in abutment with the toner carrier and supplied with a voltage corresponding to an image information signal, transferring the toner pattern onto a conveying member by a first electric field formed between the toner carrier and the conveying member, transcribing by a second electric field the toner pattern on the conveying onto a sheet of plain paper transported by a transcribing belt, fixing the toner pattern to the sheet of plain paper to produce a fixed image thereon. The method is capable of forming an image on any paper at a low running cost and low costs of apparatus.

25 Claims, 5 Drawing Sheets

METHOD AND APPARATUS FOR FORMING AN IMAGE ON A RECORDING MEDIUM

BACKGROUND OF THE INVENTION (a) Field of the Invention

The present invention relates to a method and an apparatus for forming an image on a recording medium and, more particularly, to a method and an apparatus for forming an image on a recording medium such as plain paper, without using a latent image forming member such as a light-sensitive member and a magnetic drum.

(b) Description of the Related Art

Conventional methods for forming an image on a recording medium such as plain paper include a method in which a material on a ribbon is thermally or mechanically transferred onto a recording medium to form an image thereon, a method in which a liquid printing material is jetted for forming an image, and an electrophotographic method in which a latent image forming member such as a light-sensitive member, a dielectric, and a magnetic drum are used, as well as a method utilizing printing technology.

The conventional method utilizing a printing technology as mentioned above requires many steps before reaching the printing step, and also requires an expensive printing machine. Therefore, there are problems in that each copy becomes expensive when the number of copies to be printed is small, and that it requires a prolonged period of time to output copies.

Further, the conventional method in which a printing material, whether in the form of a ribbon or a liquid, is used for forming an image has problems in that its printing speed is low and that a high print quality cannot be obtained in terms of resolution and gradation.

Although a sublimation method can be used, such a method has a problem with respect to cost because it requires special paper. Further, the method utilizing a latent image forming member as in an electrophotographic method has problems that a process for outputting an image is complicated and that stable operation is not obtained. In addition, this method has problems in that it requires many components and that careful maintenance is needed for the latent image forming member, resulting in a high printing cost.

SUMMARY OF THE INVENTION

In view of the foregoing, an object of the present invention is to provide a method and an apparatus for forming an image on a recording medium such as plain paper, which does not require a complicated process, which can increase the printing speed, which can reduce the running cost and the cost of the apparatus, and which can perform color printing as well as monochrome printing.

An image forming method according to the present invention comprises the steps of: supplying toner onto a toner carrier to form a toner pattern injected with static charge; transferring the toner pattern on the toner carrier onto a conveying member by applying an electric field directing the static charge toward the conveying member; and transcribing the toner pattern on the conveying member onto a recording medium.

The transcribing step may be carried out by applying a second electric field directing the static charge toward the recording medium. Preferably, the image forming method further includes a step of fixing the toner on the recording medium onto the recording medium.

An image forming apparatus according to the present invention comprises: a toner carrier capable of carrying toner thereon; a toner supply control member having a conductive edge portion disposed in abutment with said toner carrier, said conductive edge portion being supplied with a voltage corresponding to an image forming signal relative to said toner carrier for controlling the toner carried by said toner carrier; a conveying member disposed in opposed relation to said toner carrier for receiving the toner from said toner carrier by means of an electric field applied between said toner carrier and said conveying member; a transcribing member disposed in opposed relation to said conveying member for transcribing the toner on said conveying member onto said recording medium.

With the transcribing member of the image forming apparatus according to the present invention, the transcribing member is preferably applied with a second electric field between the transcribing member and the conveying member. Further, the image forming apparatus preferably comprises a fixing member for fixing the toner on the recording medium onto the recording medium.

In accordance with the image forming method and apparatus of the present invention, a toner pattern can be formed on a toner carrier in accordance with an image information signal by controlling the supply of the toner injected with electric charge, transferred onto the conveying member by means of an electric field, and transcribed onto a recording medium. Hence, an image can be formed on the recording medium in accordance with the image information signal without using a latent image carrier such as a light-sensitive member, which is liable to be affected by the environmental conditions. As a result, it is possible that formation of a toner pattern as a developed image on the toner carrier and transferring of the toner pattern to the conveying member is effected in a stable operation.

DESCRIPTION OF PREFERRED EMBODIMENTS

Now, the present invention will be described by means of preferred embodiments thereof with reference to the drawings.

Figure 1A:
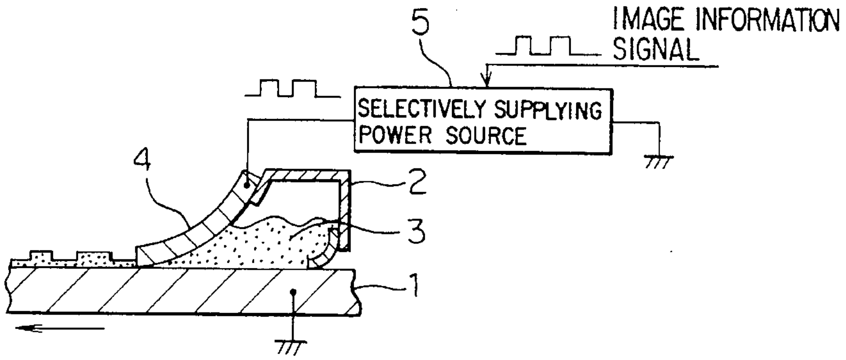
FIGS. 1A to 1E are schematic cross-sectional views showing successive steps of a first embodiment of an image forming method according to the present invention.

FIGS. 1A to 1E schematically show successive steps of a first embodiment of an image forming method according to the present invention. FIG. 1A shows a selectively supplying step of the image forming method, in which there are shown a toner carrier 1, a toner container 2, a toner 3 contained in the toner container 2, a toner supply control member (blade) and a selectively supplying power source 5. An image information signal is supplied to the selectively supplying power source 5, the output of which varies from −300 V to −500 V in accordance with the image information signal, as schematically illustrated in the drawing. When an image information signal is not applied to the selectively supplying power source 5, the output of the power source 1 is maintained at 0 V.

The output of the selectively supplying power source 5 is applied to the toner supply control member 4, while the toner carrier 1 is maintained at a ground potential. The toner supply control member 4 electrically and mechanically functions for controlling the toner mass applied on the surface of the toner carrier 1 and controlling the amount of charge injected to the toner on the toner carrier 1. By moving the toner carrier 1 in the direction of the arrow, a pattern of the toner is formed on the toner carrier 1 in accordance with the image information signal.

The toner supply control member 4 is mounted to the toner container 2 at a first edge portion thereof and has a second edge portion thereof opposing to the first edge portion and disposed in abutment with the surface of the toner carrier 1. The toner supply control member 4 has electric conductivity and resilience. The changes in the output voltage supplied from the selectively supplying power source 5 cause changes in magnitude of the electric field between the toner supply control member 4 and the toner carrier 1, which in turn changes the pressure with which the second edge portion of the toner supply control member 4 abuts the toner carrier 1, thereby changes the amount of the toner 3 adhering to the toner carrier 1, and also changes the amount of negative charge in the toner pattern formed on the toner carrier 1.

Figure 1B:
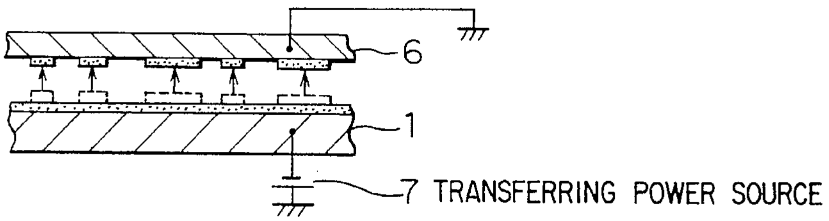

FIG. 1B shows a transferring step in which the toner pattern formed as a developed image on the toner carrier is transferred to a conveying member 6. The toner pattern formed on the toner carrier 1 in the previous selectively supplying step is moved to face the conveying member 6 which is shown as maintained at a ground potential in the drawing, with a certain clearance disposed therebetween. The toner carrier 1 is shown having applied thereto an output (about −1 kV, for example) of a transferring power source 7, so that the toner pattern forming the developed image is transferred from the toner carrier 1 to the conveying member 6 by an electric field formed between the conveying member 6 and the toner carrier 1. Although the toner pattern on the toner carrier 1 includes an image portion and a non-image portion, only the toner at the image portion is transferred to the conveying member 6 because of differences in the toner mass in the pattern and the amount of negative charge in the toner.

Although a clearance is formed between the toner pattern on the toner carrier 1 and the conveying member 6 in FIG. 1B, this arrangement is employed for preventing the toner at the non-image portion from being transferred to the conveying member 6. This is considered taking account of the possibility that the toner may exist at the non-image portion. However, formation of the clearance is not essential, because it becomes possible, depending on the structure of the toner supply control member 4 and the output pattern of the selectively supply power source 5, to avoid adhesion of the toner at the non-image area, or to employ the thickness and/or charge of the toner at the non-image portion much different from that of the toner in the image portion. When a clearance is not formed between the toner pattern and the conveying member 6, the voltage of the transferring power source 7 is lowered down to several hundreds volts.

Figure 1C:
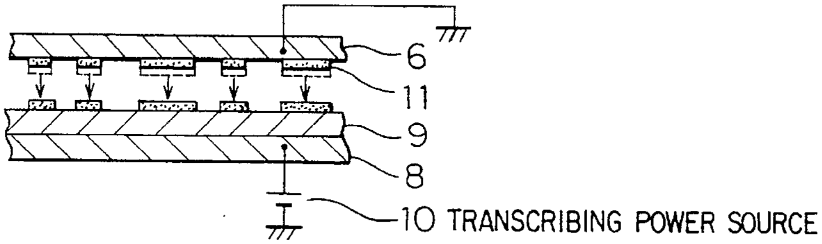

FIG. 1C shows a transcribing step in which the toner pattern on the conveying member 6 is transcribed onto a recording medium 9 such as a sheet of plain paper. The toner pattern on the conveying member 6 maintained at a ground potential is conveyed to face the recording medium 9 carried on a transcribing member 8, to which an output voltage of about +1 kV is supplied from the transcribing power source 10. The toner pattern on the conveying member 6 is transcribed onto the recording medium 9 by an electric field formed between the conveying member 6 and the transcribing member 8. Although a clearance is formed between the toner pattern on the conveying member 6 and the recording medium 9 in FIG. 1C, it is preferred that the recording medium 9 is disposed as close as possible to the toner pattern to increase the transcription efficiency and to prevent deterioration of images. The voltage of the output of the transcribing power source 10 has an absolute value approximately equal to that of the output of the transferring power source 7. As shown in FIG. 1C, each of the bottom portions of the toner remains as remaining toner 11 on the conveying member 6 after the transcribing step.

Figure 1D:
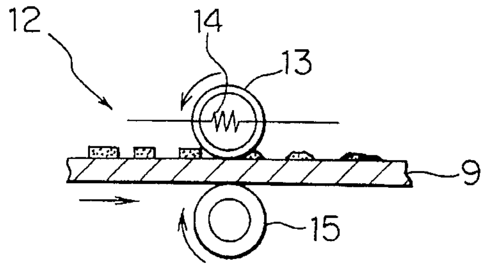

FIG. 1D shows a fixing step in which the toner which has been transcribed onto the recording medium 9 is fixed thereto. In this step, the developing image transcribed to the recording medium 9 in the previous transcribing step is subjected to heat and pressure generated by a heat/pressure fixing section 12 which is mainly composed of a heating roller 13 and a pressure roller 15, so that a fixed image is obtained on the recording medium 9.

Figure 1E:
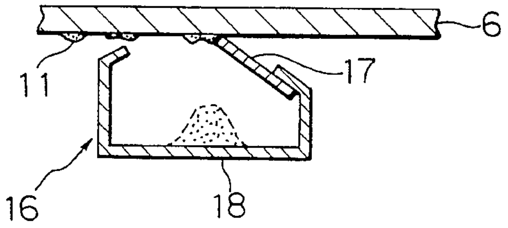

On the other hand, as for the toner remaining on the conveying member 6 after the developing image has been transcribed onto the recording medium 9, the toner is removed in a cleaning section 16 including a cleaning blade 17 and a toner collecting container 18, in a removing step shown in FIG. 1E. With this step, the conveying member 6 is renewed for use in a successive image forming process.

Figure 2A:
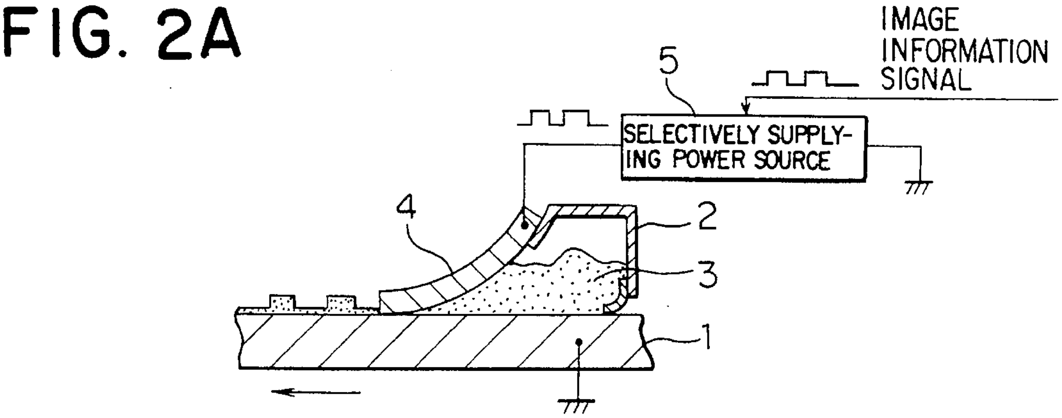
FIGS. 2A to 2D are schematic cross-sectional views showing successive steps of a second embodiment of an image forming method according to the present invention.
Figure 2B:
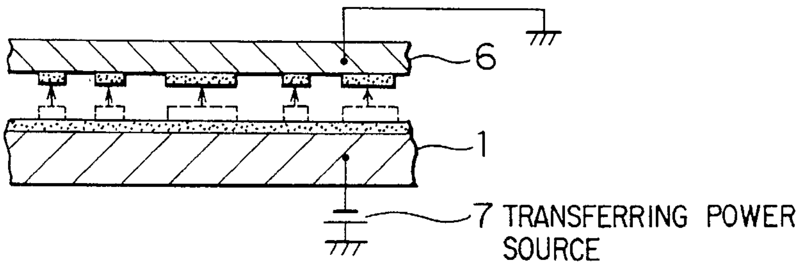

FIGS. 2A to 2D show successive steps of a second embodiment of an image forming method according to the present invention. FIG. 2A shows a selectively supplying step, while FIG. 2B shows a transferring step. Since these drawings are similar to FIGS. 1A and 1B of the first embodiment, respectively, description thereof will not made here in order to avoid duplication. Reference numerals in these drawings are the same as those in FIGS. 1A and 1B.

Figure 2C:
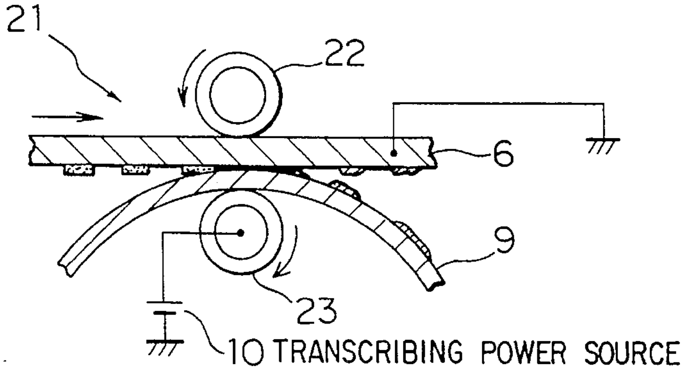

FIG. 2C shows a transcribing/fixing step in which a toner pattern, which was transferred onto a conveying member 6 from a toner carrier 1 in the previous step, is transcribed onto a recording medium 9 such as a sheet of plain paper and is fixed there to at the same time. The toner pattern on the conveying member 6 is conveyed to the transcribing/fixing section 21 including a pressing fixing roller 22 and a transcribing roller 23 so that the toner pattern on the conveying member 6 contacts a recording medium 9 disposed between the conveying member 6 and the transcribing roller 23. The pressing fixing roller 22 is disposed to press the back surface of the conveying member 6 against a transcribing roller 23 so that the toner pattern formed on the front surface of the conveying member 6 is pressed toward the recording medium 9.

The conveying member 6 is maintained at ground potential while the transcribing roller 23 is applied with a positive voltage by a transcribing power source 10. Hence, the toner pattern on the conveying member 6 is transcribed onto the recording medium 9 by an electric field formed between the conveying member 6 and the transcribing roller 23. Simultaneously with the transcription, the toner pattern is pressed and fixed by the pressing fixing roller 22 so that a fixed image of the toner pattern is obtained on the recording medium 9.

Figure 2D:
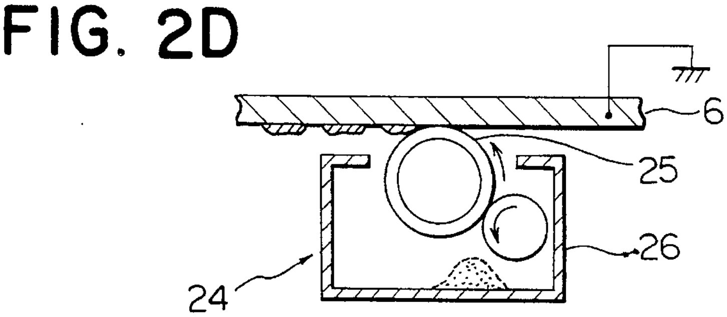

FIG. 2D shows a removing step for removing the toner remaining on the conveying member 6 after the transcribing/fixing step. In this step, the toner remaining on the conveying member 6 is removed by a cleaning web 25 included in removing section 24, and is collected into a toner collecting container 26 so that the conveying member 6 is renewed for use in a successive image forming process.

Figure 3:
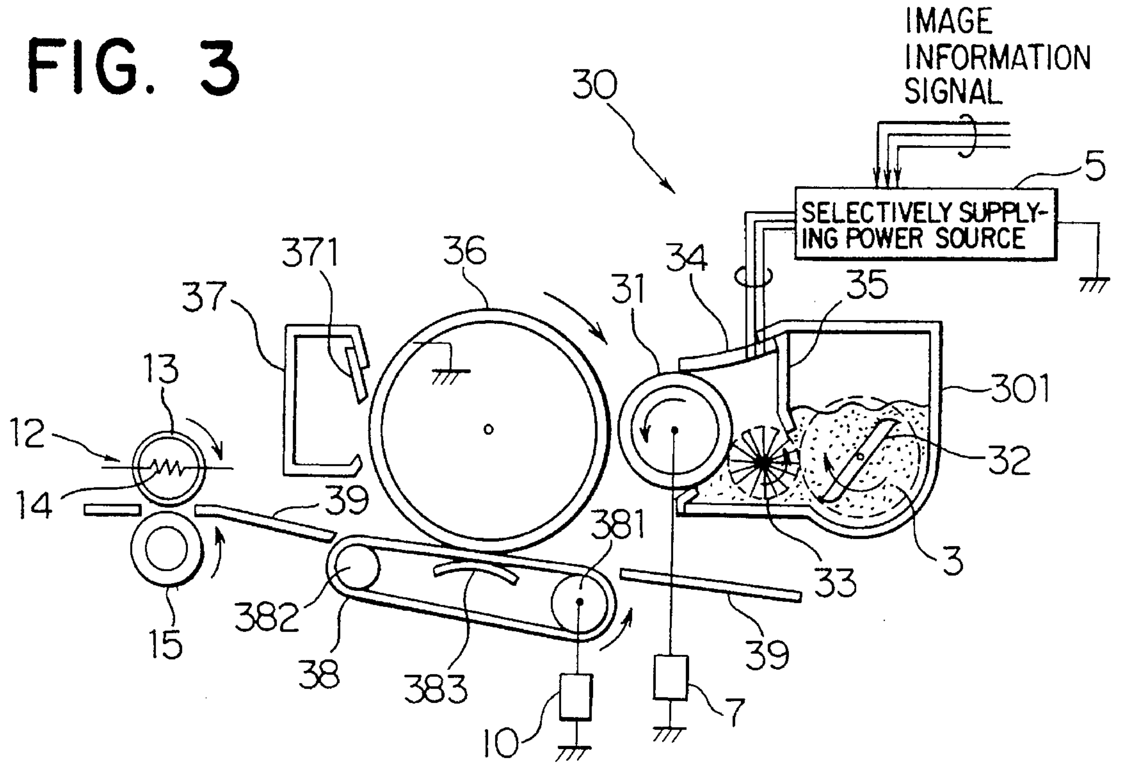
FIG. 3 is a schematic cross-section of a first embodiment of an image forming apparatus according to the present invention.

FIG. 3 is a sectional view of a first embodiment of an image forming apparatus according to the present invention. The first embodiment of the image forming apparatus comprises a developing unit 30 having a toner carrier (roller) 31, a conveying roller 36 disposed in opposed relation to the toner carrier 31, a transcribing belt conveyor 38 for conveying a recording medium thereon and disposed in contact with the conveying roller 36 at a transcribing position, a fixing unit disposed downstream of the transcribing belt conveyor 38, and a cleaning section 37 having a cleaning blade 371 disposed in contact with the conveying roller 36 at the downstream of the transcribing position, where the conveying member 36 and the transcribing belt conveyor 38 meet, as viewed in the direction of the rotation of the conveying roller 36.

The developing unit 30 also comprises a container 301, a resilient agitation paddle 32 for agitating a toner 3 in the container 301 by rotation thereof in the direction shown by an arrow in the drawing, a toner supply member 33 formed of a conductive rotating fibrous brush cylinder and functions for supplying the toner 3 by rotation to the toner carrier 31, a toner supply control blade 34 having an edge portion disposed in abutment with the toner carrier 31, a partitioning plate 35 for preventing the toner 3 from being supplied directly to the toner carrier 31 due to the rotation of the agitation paddle 32, a transferring power source 7, and a selectively supplying power source 5.

The toner carrier 31 is a cylindrical roller made of aluminum, stainless steel, or a conductive resin. The toner supply control blade 34 is supplied with the output of the selectively supplying power source 5, which is supplied with an image information signal. The toner supply control blade 34 controls the supply of the toner 3 onto the toner carrier 31 through the output of the selectively supplying power source 5 which varies in accordance with the image information signal. The conductive fibrous brush cylinder 33 acting as a toner supply member is made of a resinous fiber such as nylon or rayon into which carbon having electric conductivity is dispersed.

Figure 4A:
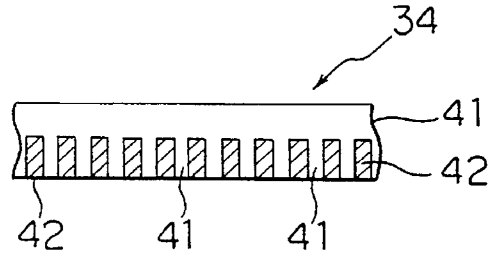
FIGS. 4A to 4C are cross-sections each showing a configuration of a toner supply control member used in the image forming apparatus of FIG. 3.
Figure 4B:
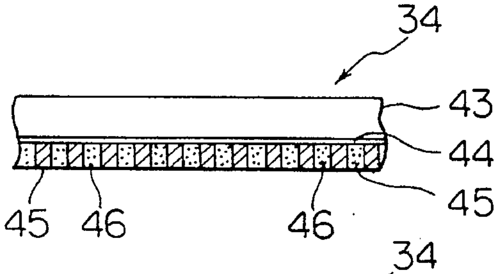
Figure 4C:
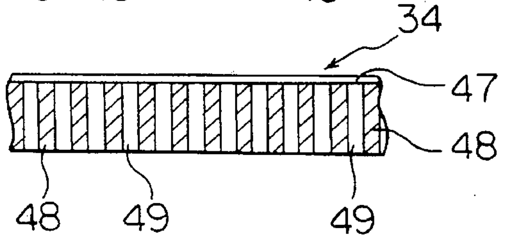

FIG. 4A to 4C each shows a cross section of the toner supply control blade 34. As shown in these drawings, the toner supply control blade 34 is divided in its front surface at intervals corresponding to the pitch of pixels so that conductive portions and insulating portions are alternately arranged in the longitudinal direction of the toner carrier 31. The front surface of the toner supply control blade 34 is disposed in abutment with the toner carrier 31 at an end portion including the front surface portion thereof as shown in FIG. 3.

FIG. 4A shows a construction of a toner supply control blade in which a resilient conductive portion 42 made of a material having an electric conductivity in the range of about $10^3$–$10^4\Omega/cm^3$, such as conductive carbon dispersed silicon, is embeded into an elastic insulating blade 41 having a resistance of $10^{10}\Omega/cm^3$ or higher, such as urethane. FIG. 4B shows another construction of a toner supply control blade in which conductive portions 45 made of a material, such as thin strips of a metal, are bonded at the bonding interface 44 with an adhesive 46 to the front surface of an elastic insulating blade 43, such as a urethane plate. The pitch of the front surface of the toner supply control blade of FIG. 4B corresponds to the pitch of pixels. FIG. 4C shows a construction of still another toner supply control blade in which conductive portions 48 and insulating portions 49, both of which have a similar resilience, are alternately laminated. As shown in the drawing, a film 47 made of polyethyleneterephthalate, for example, is bonded to the edges of the laminated films 48 and 49 to form the back surface opposite to the front surface of the toner supply control blade, for acting as a thin protection member which increases stability of the laminated control blade. In each of the toner supply control blades of FIGS. 4A, 4B and 4C, the front surface contacting the toner carrier 31 is mechanically ground or treated to obtain a fine flat surface. The toner supply control blade 34 has a preferable resilience such that the tensile elastic modulus falls in the range of 20–120 $kg/cm^2$, and more preferably, in the range of 40–70 $kg/cm^2$. Each of the conductive portions 42, 45 and 48 of the toner supply control member 34 is supplied with the output from the selectively supplying power source 5, as shown in FIG. 3. The output of the selectively supplying power source 5 may be an ON-OFF signal or may be a signal having an offset.

Back to FIG. 3, the conveying roller 36 is formed of a metallic cylinder, while the transcribing belt conveyor 38 is an endless belt in which conductive layers and insulating layers are laminated. The transcribing belt conveyor 38 is supported by a transcribing belt drive roller 381 which is electrically connected to a transcribing power source 10 and a small radius roller 382 so that the endless belt 38 is moved at a speed corresponding to the rotational speed of the conveying member 36. In addition, a transcribing guide 383 is provided for securing a contact between the transcribing belt conveyor 38 and the conveying roller 36. Upstream and downstream of the transcribing belt conveyor 38 are provided stages 39 for guiding a recording medium.

The fixing unit 12, which is similar to that shown in FIG. 1D and designated by the same reference numerals as those in FIG. 1D, comprises a hollow metallic heating roller 13 treated by a mold releasing agent and having a built-in heater 14, and a pressing rubber roller 15 which slides the heating roller 13 while being pressed thereto. The fixing unit 12 is thermally controlled by the surface temperature of the heating roller 13.

In operation of the image forming apparatus of FIG. 3, when the image forming apparatus is started, the toner carrier 31, the toner supply member 33, the agitation paddle 32, the conveying roller 36, the transcribing belt conveyor 38, the heating roller 13 and the pressing roller 15 initiate their respective rotations. The heating roller 15 is heated, before or simultaneously with its start of rotation, by supplying power to the heater 14 in the heating roller 13. When the surface temperature of the heating roller 13 reaches a predetermined temperature, the output of the transferring power source 7 is supplied to the toner carrier 31.

By the rotation of the agitation paddle 32 in the developing unit 30, the toner 3 in the container 301 is directed toward the toner supply member 33, at which the toner 3 is charged into the toner supply member 33 due to friction between the fiber of the toner supply member 33 and the toner, and then supplied onto the toner carrier 31. The toner 3 then adheres to the surface of the toner carrier 31, and is carried by the rotation of the toner carrier 3 to a location at which the toner carrier 31 is in contact with the toner supply control blade 34. At this time, i.e. immediately after the start of the image forming apparatus, the toner supply control member 34 has not yet been supplied with the output of the selectively supplying power source 5 which varies in accordance with the image information signal. Accordingly, the toner supply control member 34 produces on the surface of the toner carrier 31 only a layer of the toner which is uniform in the longitudinal direction of the toner carrier 31. Since the layer of the toner has neither a sufficient amount of electrical charge nor a sufficient thickness of the toner at this stage, the toner will not be transferred to the conveying member 36 when it faces the conveying member 36.

Subsequently, an image information signal is input to the selectively supplying power source 5 so that the selectively supplying power source 5 supplies the conductive portions, e.g. 42 of FIG. 4A, of the toner supply control blade 34 with an output varying corresponding to the image information signal. When the output corresponding to the image information signal is supplied from the selectively supplying power source 5, the toner supply control member 34 changes the toner mass and the amount of static charge injected to the toner on the toner carrier 31. Hence, a developing image is formed as a toner pattern on the surface of the toner carrier 31 in accordance with the image information signal after it passes the toner supply control blade 34 disposed in abutment therewith.

The developing image cannot be visually found on the toner carrier 31 from the toner pattern at this stage immediately after it passes the toner supply control blade 34, partly because the toner adheres to an area corresponding to the non-image portion as well as an area corresponding to the image portion. However, the characteristics of the toner portion in the area corresponding to the image portion differ from those of the toner portion in the area corresponding to the non-image portion with respect to the toner mass (i.e. the thickness of the toner) and the amount of charge injected thereto.

The developing image formed as a toner pattern on the toner carrier 31 is transported to a location where the toner pattern opposes to the conveying roller 36, and only the toner portion in the area corresponding to the image portion is transferred to the conveying roller 36 by the electric field formed between the grounded conveying member 36 and the toner carrier 31 to which the output from the transferring power source 7 is applied. At this location where the surfaces of the toner carrier 31 and the conveying roller 36 face each other, they move in the same direction and at the same speed. The toner portion remaining on the toner carrier 31, which has not been transferred from the toner carrier 31 to the conveying roller 36 in the transferring step, is collected into the container 301 with the rotation of the toner carrier 31, and used for forming developing images in a subsequent image forming process.

The toner pattern which has been transferred onto the conveying member 36 is transported or conveyed together with the surface portion of the conveying roller 36 to a location where it faces the transcribing belt conveyor 38 for transcription. The toner pattern transported to the location of the transcribing belt conveyor 38 meets a recording medium, such as plain paper, which is fed onto the transcribing belt conveyor 38 from the stage 39 synchronously with the transportation of the toner pattern to the location for the transcription. The toner pattern is then transcribed onto the recording medium by an electric field formed between the grounded conveying roller 36 and the transcribing belt conveyor 38 to which the output of a transcribing power source 10 is supplied. The moving speed of the surface of the conveying roller 36 is equal to the moving speed of the recording medium, and they move in the same direction at the location at which they face each other.

The toner pattern transcribed onto the recording medium is then transported to the fixing unit 12, in which the toner pattern is fixed on the recording medium by the pressing roller 15 and the heating roller 13 having a predetermined elevated temperature so that a fixed image is produced on the recording medium in accordance with the toner pattern.

On the other hand, the toner, which remains on the conveying roller 36 after the transcription of the toner pattern, is removed by a cleaning blade 371 of the cleaning section 37. The surface portion of the conveying roller 36 thus cleaned is then moved again to the location facing the toner carrier 31 for use in a subsequent image formation. Formation of images proceeds while the above-described operation is repeated.

With the image forming apparatus of the embodiment as described above, not only a DC power source but also a power source outputting DC voltage on which AC voltage is superimposed may be used as the transferring power source 7. In addition, although an example has been shown in which a cylindrical metallic roller is used as the conveying member 36, an endless thin member made of a metal may be used. Further, a transcribing corotron or a transcribing roller may be used instead of the transcribing belt conveyor 38. As the fixing unit, not only a roller type fixing unit but also a belt type fixing unit, a non-contact flash lamp and other fixing units can be used. Furthermore, the cleaning section is not limited to only a blade type cleaner, but a brush type or a vacuum cleaner may be used. If an output of an additional power source or the output of the transferring power source 7 is applied to the toner supply member 33, then efficiency of the supply and electrical charging of the toner 3 can be improved. Also, the toner supply member 33 need not be of a material having electric conductivity.

Figure 5:
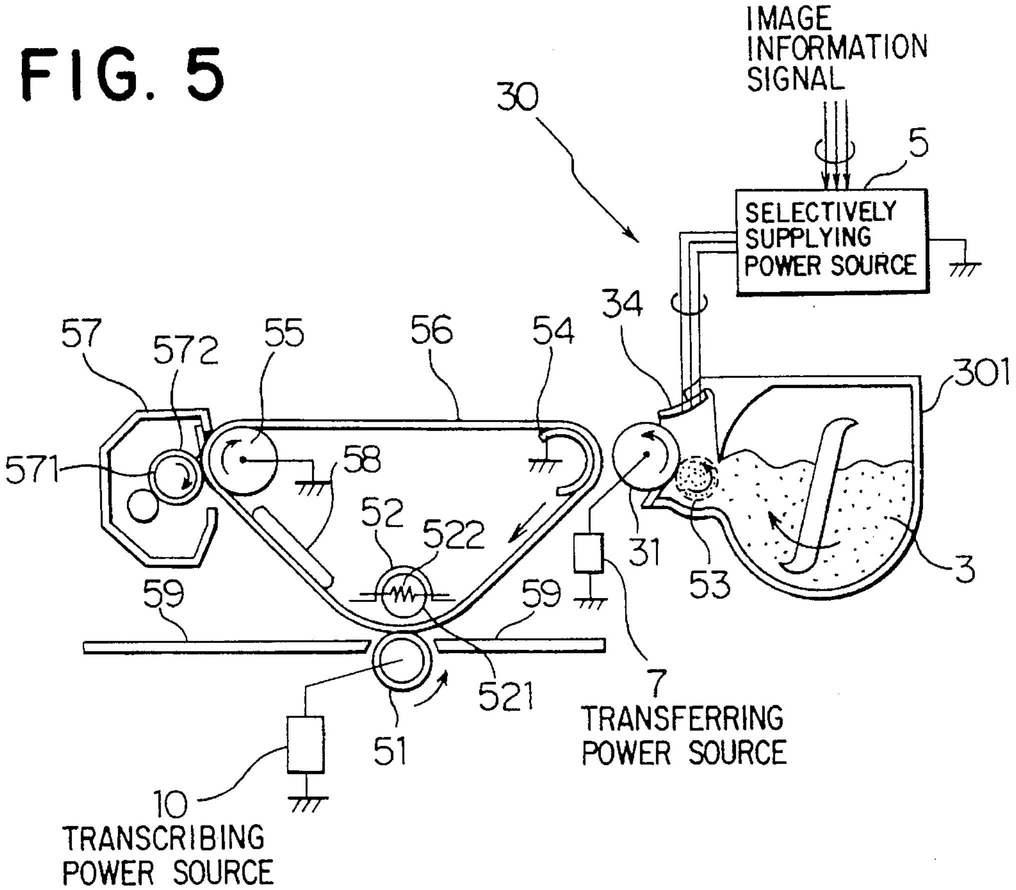
FIG. 5 is a cross-section of a second embodiment of an image forming apparatus according to the present invention.

FIG. 5 shows a cross-section of a second embodiment of the image forming apparatus according to the present invention. The image forming apparatus according to this embodiment shown in FIG. 5 differs from the embodiment shown in FIG. 3 in that an endless thin belt made of a metal is used as a conveying member 56 to simultaneously carry out the transcribing step and the fixing step. Namely, the image forming apparatus according to the second embodiment is composed of a developing unit 30 which has a toner carrier 31 and a toner supply control blade 34, a conveying belt 56 which is formed of an endless belt made of a thin metallic material, a conveying belt drive roller 55 for driving the conveying belt 56, a curved plate 54 disposed or enabling the conveying belt 56 to face the toner carrier 31 at a developing position, a heating section 52 having a curvature member 521 heated by a heater 522 for heating the toner pattern on the conveying belt 56, a transcribing roller 51 which is pressed toward the curvature member 521 of the heating section 52 by a spring not shown, a stage 59, a cleaning section 57 opposing the conveying belt drive roller 55, with the conveying belt 56 disposed therebetween, a selectively supplying power source 5, a transferring power source 7, and a transcribing power source 10, all of these power sources being similar to those in the embodiment of FIG. 3 in construction and function thereof.

Since the structure of the developing unit 30 is similar to that in the first embodiment shown in FIG. 3, description thereof will not be made here in detail. In the developing unit shown FIG. 5, however, there is shown in a porous conductive member used as a toner supply member 53. The porous conductive member 53 is made of, for example, a soft polyurethane foam including conductive carbon and having a three-dimensional structure.

The conveying belt 56 is driven and supported by the conveying belt drive roller 55, and supported by the curved plate 54 and the curvature member 521 of the heating section 52. The transcribing roller 51 is a metallic roller which is covered by a material similar to that of the porous conductive member 53, or by a conductive rubber such as a silicon rubber having conductivity.

As the cleaning section 57, a cleaning roller 571 having webs 572 formed on its surface is shown as an example. The webs 572 of the cleaning roller 571 makes inroad into the conveying belt 56 by about 0.5 mm, and rotates in a direction opposite to the direction of movement of the conveying belt 56 at the location where they meet and at a surface speed which is about double the surface speed of the conveying belt 56.

The operational steps of the apparatus of FIG. 5 before the transcribing step in which the toner pattern on the conveying member 56 is transcribed onto a recording medium are similar to those before the transcribing step in the first embodiment shown in FIG. 3, hence, description of these steps will not be made here for the sake of brevity.

A recording medium is transported from the stage 59 simultaneously with the transportation of the toner pattern by the movement of the conveying belt 56 to the location at which the transcribing roller 51, the conveying belt 56 and the heating section 52 meet. The toner pattern on the conveying belt 56 is then transcribed onto the recording medium by the transcribing roller 51 to which the output voltage of the transcribing power source 10 is applied. At the same time, the toner pattern is fixed to the recording medium by the curvature member 521 of the heating section 52 located behind the conveying belt 56 as observed from the transcribing roller 51. The recording medium for which transcription and fixing has been made is discharged to the stage 59 by rotational movements of the transcribing roller 51 and the conveying belt 56.

After the transcribing/fixing step in which the toner pattern on the conveying belt 56 is transcribed/fixed onto the recording medium, the toner remaining on the conveying belt 56 is removed by the cleaning section 57. Although the conveying belt 56 is heated by the heating section 52, the cleaning can be performed well because the heat in the conveying belt 56 is radiated through a radiation plate 58 and the conveying belt drive roller 55 which is made of a metal. In this respect, i.e., for effective cleaning in order to obtain an excellent image, it is preferred that the conveying belt 56 and the toner carrier 31 do not contact each other in the transferring step in the present embodiment. Also, it is preferred that the surface of the conveying belt 56 be covered or coated with a silicon based film having an excellent mold releasability. The portion of the conveying member 56 thus cleaned is then moved again to the developing position for use in a subsequent image formation. Formation of images proceeds while the above described operation is repeated.

A film of a resin such as polyimide may be used as the conveying belt 56 in place off a metal. In the case of polyimide film, injection of electric charge to the film should be avoided, and it is preferred to dispose a device for removing static charge from the polyimide film.

Figure 6:
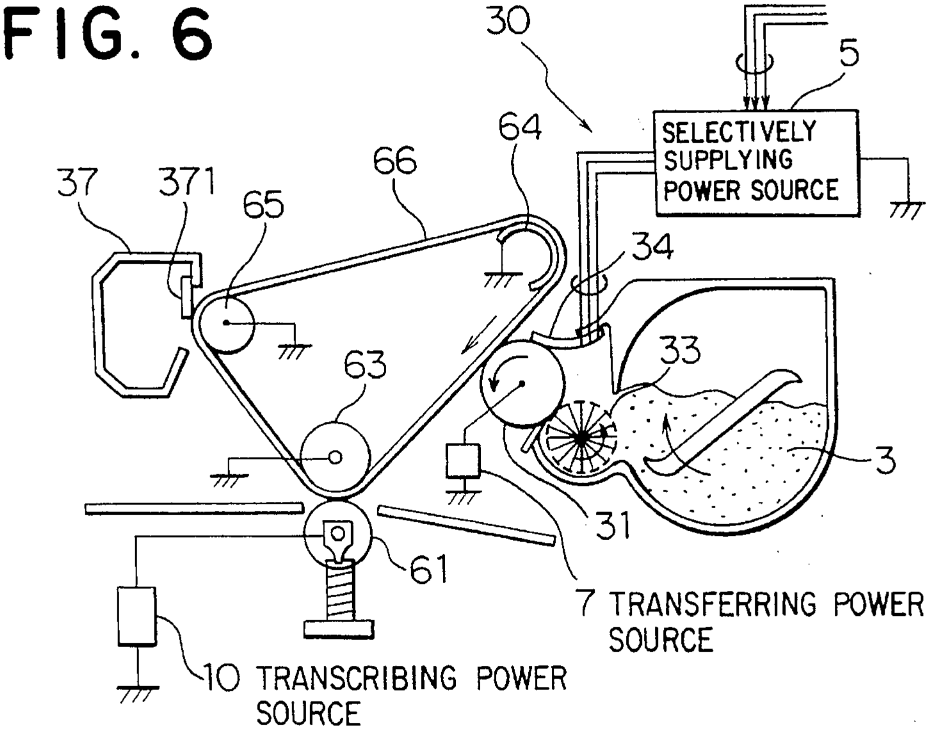
FIG. 6 is a cross-section of a third embodiment of an image forming apparatus according to the present invention.

FIG. 6 is a sectional view showing the structure of a third embodiment of an image forming apparatus according to the present invention. The embodiment shown in FIG. 6 differs from the embodiment shown in FIG. 5 in that the conveying belt 66 and the toner carrier 31 are disposed in abutment with each other at a location between support members 64 and 63 for supporting the conveying member 66, and in that fixing is effected by pressure at the transcribing/fixing section. Additional differences, although minor, are that the toner supply member 33 in the developing unit 30 is made of a conductive fibrous brush cylinder as in the first embodiment shown in FIG. 3, and that the cleaning section 37 is of a blade type as is the case in the first embodiment. However, these differences in the minor portions are not significant.

In the construction of FIG. 6 that the conveying belt 66 is in abutment with the toner carrier 31, the toner pattern can be transferred to the conveying belt 66 with high resolution and less dusts. However, this abutment condition cannot be obtained between two hard members. Accordingly, the toner carrier 31 is disposed between the support members 64 and 63, one of which is a curved plate 64 and the other of which is a pressing roller 63, both for supporting the conveying belt 66. With this structure, mechanical accuracy required for assembling the components of the developing unit 30 and for mounting the conveying belt 66 can be lowered as compared to the first and second embodiments shown in FIG. 3 and FIG. 5. In addition, since a fixing step is conducted by applying pressure without heating, the risk of temperature rise in the conveying belt 66 and hence the risk of filming of the toner pattern onto the conveying member 66 can be reduced.

The operation of the imaging forming apparatus shown in FIG. 6 is similar to that in the image forming apparatus shown in FIG. 5 and an only difference between the two is that the fixing process of the image forming apparatus of FIG. 6 is conducted by pressure fixing. Hence, further description of the operation thereof be omitted.

Figure 7:
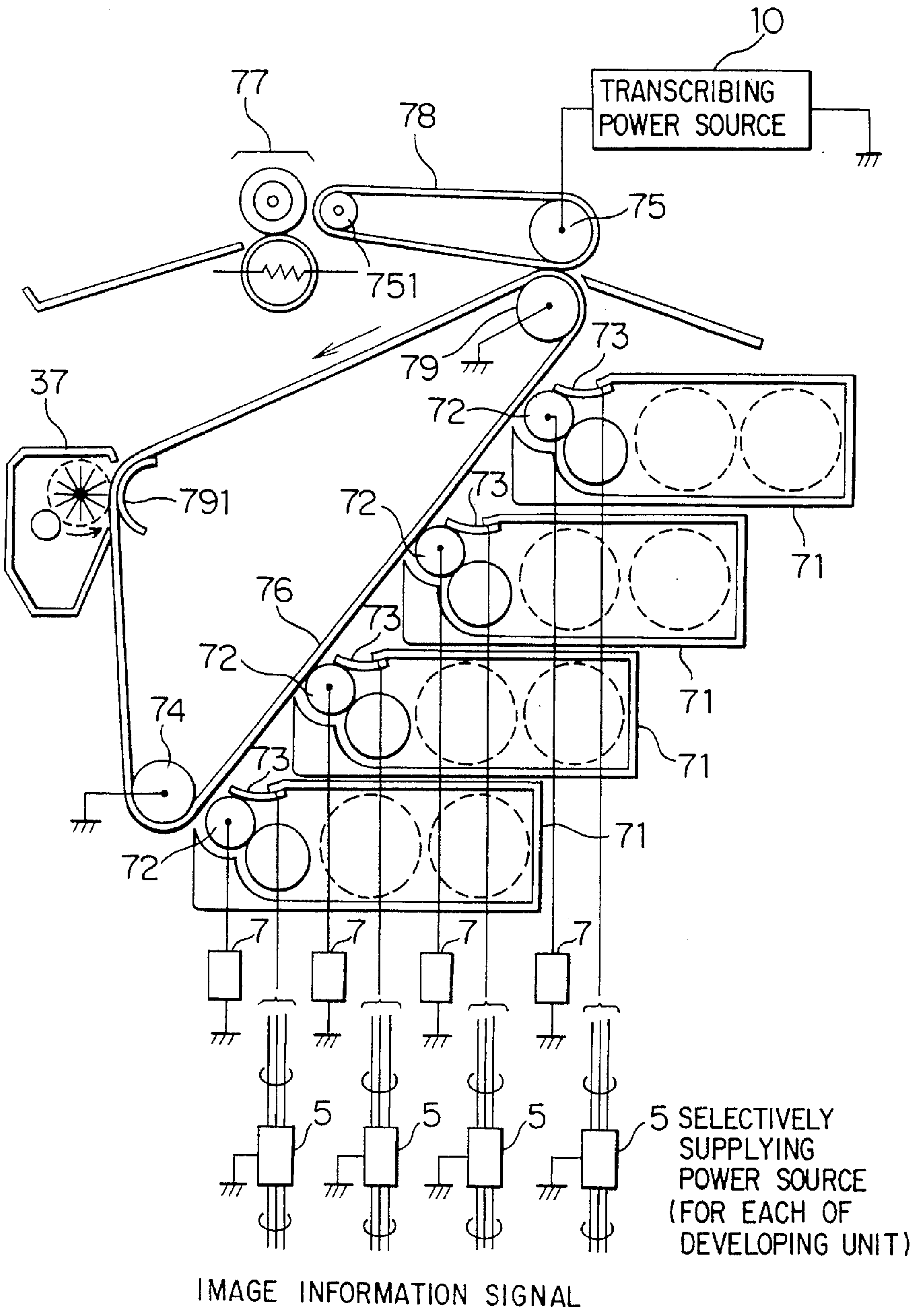
FIG. 7 is cross-section of a fourth embodiment of an image forming apparatus according to the present invention.

FIG. 7 is a sectional view showing the structure of a fourth embodiment of an image forming apparatus according to the present invention. The image forming apparatus shown in FIG. 7 is used for forming a color image. Developing units 71 each having a toner carrier are disposed for yellow, magenta, cyan and black, and each of the toner carries 72 is disposed to face a conveying belt 76, with a clearance formed therebetween. The developing units 71 are disposed between rollers 74 and 79 supporting the conveying belt 76.

A transferring power source 7 provided for each of the developing units 71 is connected to corresponding one of the toner carriers 72 of the developing units 71. A selectively supplying power source 5 provided for each of the developing units 71 is connected to a corresponding one of toner supply control blades 73 of the developing units 71. A transcribing belt 78 and a fixing unit 77 have structures similar to those in the image forming apparatus of FIG. 3. In the transcribing section, the transcribing belt drive roller 75, disposed for driving the transcribing belt 78 and connected to the transcribing power source 10, opposes to a conveying belt drive roller 79, with the conveying belt 76 disposed therebetween. The conveying belt drive roller 79 has a relatively small diameter for facilitating separation of a recording medium from the conveying belt 76.

A cleaning section 37 is disposed at a location where a curved plate 791 for supporting the conveying belt 76 is disposed. The transcribing belt 78 has another function of transporting a recording medium toward the fixing unit 77 after the toner pattern has been transcribed onto the lower surface of the recording medium. Since the output from the transcribing power source 10 is applied to the transcribing belt 78, the recording medium is electrostatically attracted toward the transcribing belt 78, so that transportation of the recording medium is effected by the transcribing belt 78. In the fixing unit 77, the recording medium is separated from the transcribing belt 78 at a location where the transcribing belt 78 is turned by a small radium roller 751.

In operation of the image forming apparatus shown in FIG. 7, when the image forming apparatus is started, the rotatable components thereof start their rotations. Image information signals for the respective colors, which are output from a color image controller (not-illustrated), are input to the selectively supplying power sources 5 for the developing units 71, so that each of the selectively supplying power sources 5 supplies to each of the conductive portions of each of the toner supply control blades 73 in the developing units 71 its outputs which vary in accordance with the image information signals. As a result, developing images are successively formed on each of the toner carriers 72. The image information signals from the color image controller are output such that the developing images formed by the respective developing units 71, when combined, form a full-color image on the conveying member 76. The developing images formed on the respective toner carriers 71 are successively transferred onto the conveying member 76 and are superposed thereon so that a full-color developing image formed before reaching the transcribing belt 78.

When the full color developing image formed on the conveying belt 76 is conveyed to a location at which the leading edge of the full-color developing image contacts the transcribing belt 78, a recording medium is supplied onto the transcribing belt 78. The full-color developing image on the conveying member 76 is then transcribed onto the recording medium on the transcribing belt 78, and the recording medium is then transported toward the fixing unit 77 with the movement of the transcribing belt 78. Meanwhile, the remaining toners on the conveying belt 76 are moved toward the location of the cleaning section 37, at which the remaining toners are cleaned off from the conveying belt 76 for use of the conveying belt 36 in a successive image forming process.

The recording medium on which the full color developing image had been transcribed, and which has been transported to the location of the fixing unit 77 is subjected to a fixing step so that the toner is fixed on the recording medium to produce a fixed image thereon. The formation of color images are successively carried out by repeating the above-described operation.

Although transcription and fixing are separately carried out for forming an image in the image forming apparatus shown in FIG. 7, the transcription and fixing may be carried out simultaneously, as in the image forming apparatus shown in FIG. 5 and FIG. 6. In such a case, a heat pipe can be used as a heat source instead of a electrical heater, while a heat pipe can also be used in the image forming apparatus shown in FIG. 5 or FIG. 6. Heating by a heat pipe has many advantages such as an excellent uniform thermal distribution, and an excellent temperature maintaining capability.

In addition, the respective toner carriers 72 can be arranged in abutment with the conveying member 76, as in the image forming apparatus shown in FIG. 6. In such a case, the structure should be modified such that each of the developing units has a cleaning section for eliminating the risk of color mixing in the developing units 71.

The image forming apparatus of the present invention is not limited to only a case in which a dry type toner is used, but can be one in which a liquid type toner is used. In addition, a constant voltage power source, a constant current power source, a power source in which a constant current control and a constant voltage control are combined, or a power source in which DC and AC are superimposed can be used as each of the transferring power source, the transcribing power source and the selectively supplying source. Further, in the embodiments as described above, negative charge is injected to time toner pattern. However, the toner pattern can be injected with positive charge, and in such a case, all of the supply sources are inserted opposite in polarity to those as described in the embodiments.

As described above, there is an advantage in the embodiments according to the present invention that images can be formed substantially regardless of the thickness and the quality of the recording medium on which images are formed. For example, images can be formed on special sheets such as OHP (overhead projector) sheets and label papers substantially without any problem. Furthermore, the embodiments as described above have another advantage that images can be formed without lowering the image formation speed. Additionally, the image forming apparatus can operate for a long period of time during which only minimum user maintenances, such as replenishment of toner and collection of toner in the cleaning section, are required. As a result, running costs and the costs of the apparatus can be reduced.

Further, with the embodiments of the image forming apparatus according to the present invention, since latent image forming members such as a light-sensitive material, which are liable to be affected by environmental conditions, are not used therein, stable images can be formed substantially regardless of the changes of the environmental conditions. Namely, not only formation of a developing image on the developing carrier and transfer of the toner onto the conveying member but also transcription of the toner onto a recording medium can be controlled by adjusting the outputs of the respective power sources so that a stable image can be produced. Further in addition, various images from monochrome images to full-color images can be produced by the method and apparatus according to the present invention.

Although the present invention is described with reference to the preferred embodiments, the present invention is not limited to such embodiments and it will be obvious for those skilled in the art that various modifications or alterations can be easily made based on the above embodiments within the scope of the present invention.

What is claimed is:

1. A method for forming an image on a recording medium comprising the steps of: supplying toner injected with static charge onto a toner carrier to form a toner pattern transferring the toner pattern from the toner carrier to a conveying member by applying an electric field directing the static charge toward the conveying member; transcribing the toner pattern from the conveying member onto a recording medium; and fixing the toner pattern onto the recording medium, wherein said step of supplying toner onto the toner carrier to form the toner pattern is effected by a toner supply control member having one end disposed in abutment with the toner carrier, said toner supply control member being supplied with a voltage corresponding to an image information signal to control the supply of toner and formation of the toner pattern on the toner carrier.

2. A method for forming an image on a recording medium as defined in claim 1 wherein the step of fixing the toner pattern onto the recording medium comprises the steps of applying heat and pressure to the toner pattern and recording medium.

3. A method for forming an image on a recording medium as defined in claim 1 wherein said transcribing and fixing are combined substantially in one step.

4. A method for forming an image on a recording medium as defined in claim 1 wherein said transcribing is effected by a second electric field directing the static charge toward the recording medium.

5. A method for forming an image on a recording medium as defined in claim 1 further including a step of removing the toner remaining on the conveying member after said transcribing of the toner.

6. A method for forming an image on a recording medium as defined in claim 1, wherein said step of supplying toner injected with static charge onto a toner carrier comprises the step of injecting a variable amount of static charge into the toner by the toner supply control member.

7. A method for forming an image on a recording medium as defined in claim 1, wherein the one end of the toner supply control member is disposed in abutment with the toner carrier at a pressure which changes according to changes in magnitude of the electric field between the toner supply control member and the toner carrier.

8. An apparatus for forming an image on a recording medium comprising: a toner carrier rotating about a fixed point for carrying toner thereon; a toner supply control member having a conductive edge portion disposed in abutment with said toner carrier, said conductive edge portion being supplied with a voltage corresponding to an image information signal relative to said toner carrier for controlling the supply of toner and formation of a toner pattern onto said toner carrier in response to said voltage; a conveying member movably disposed in opposed relation to said toner carrier for receiving the toner from said toner carrier by means of an electric field applied between said toner carrier and said conveying member; a transcribing member movably disposed in opposed relation to said conveying member for transcribing the toner on said conveying member onto a recording medium; and a fixing station for fixing the toner onto the recording medium.

9. An apparatus for forming an image on a recording medium as defined in claim 8 wherein said fixing station is located downstream of said transcribing member for fixing the toner onto said recording medium after the recording medium has passed said transcribing member.

10. An apparatus for forming an image on a recording medium as defined in claim 8 wherein said transcribing member cooperates with said fixing station for transcribing and fixing the toner onto said recording medium at the same time.

11. An apparatus for forming an image on a recording medium as defined in claim 8 wherein said toner supply control member has a plurality of said conductive edge portions and a plurality of insulating edge portions disposed in abutment with said toner carrier, said conductive edge portions and said insulating edge portions being disposed alternately with each other.

12. An apparatus for forming an image on a recording medium as defined in claim 11 wherein each of said insulating edge portions and said conductive edge portions is made of a resilient material.

13. An apparatus for forming an image on a recording medium as defined in claim 12 wherein said toner supply control member is formed of a resilient blade having a tensile elastic modulus ranging between 20 and 120 $kg/cm^2$.

14. An apparatus for forming an image on a recording medium as defined in claim 12 wherein said toner supply control member is formed of a resilient blade having a tensile elastic modulus ranging between 40 and 70 $kg/cm^2$.

15. An apparatus for forming an image on a recording medium as defined in claim 12 wherein said conductive edge portions have an electric conductivity ranging between $10^3$ to $10^4$ $\Omega/cm^3$ and said insulating edge portions have an electric conductivity above $10^{10\Omega/cm3}$.

16. An apparatus for forming an image on a recording medium as defined in claim 8 wherein said conveying member is a cylindrical roller made of a conductive material.

17. An apparatus for forming an image on a recording medium as defined in claim 8 wherein said conveying member is an endless belt made of a conductive material.

18. An apparatus for forming an image on a recording medium as defined in claim 8 wherein said toner carrier is made of conductive material.

19. An apparatus for forming an image on a recording medium as defined in claim 8 further comprising a cleaning member disposed in opposed relation to said conveying member for removing the toner remaining on said conveying member.

20. An apparatus for forming an image on a recording medium as defined in claim 8 further comprising a toner supply member made of a conductive material and disposed in relation to said toner supply control member and said toner carrier for supplying the toner onto said toner carrier via said toner supply control member.

21. An apparatus as defined in claim 9, wherein said fixing station comprises a heating roller and a pressure roller for applying heat and pressure for fixing the image onto said recording medium.

22. An apparatus as defined in claim 9, wherein said fixing station comprises a pressure roller for applying pressure for fixing the image onto said recording medium.

23. An apparatus for forming an image on a recording medium as defined in claim 8, wherein said toner supply control member and conductive edge portion thereof injects a variable amount of static charge into the toner as the toner is being supplied onto the toner carrier in accordance with the voltage applied to said conductive edge portion.

24. An apparatus for forming an image on a recording medium as defined in claims 8, wherein the conductive edge portion of said toner supply control member abuts the toner carrier with a pressure corresponding to the amount of voltage applied to said conductive edge portion.

25. An apparatus for forming an image on a recording medium as defined in claim 24, wherein the amount of pressure varies according to the magnitude of the electric field between the toner supply control member and the toner carrier.

* * * * *